United States Patent
Zhang et al.

(10) Patent No.: US 12,223,661 B2
(45) Date of Patent: Feb. 11, 2025

(54) SYSTEM FOR AUTOMATIC OBJECT MASK AND HOTSPOT TRACKING

(71) Applicant: ADOBE INC., San Jose, CA (US)

(72) Inventors: Lu Zhang, Dalian (CN); Jianming Zhang, Campbell, CA (US); Zhe Lin, Fremont, CA (US); Radomir Mech, Mountain View, CA (US)

(73) Assignee: ADOBE INC., San Jose, CA (US)

( * ) Notice: Subject to any disclaimer, the term of this patent is extended or adjusted under 35 U.S.C. 154(b) by 339 days.

(21) Appl. No.: 17/735,728

(22) Filed: May 3, 2022

(65) Prior Publication Data

US 2022/0262011 A1    Aug. 18, 2022

Related U.S. Application Data

(63) Continuation of application No. 16/900,483, filed on Jun. 12, 2020, now Pat. No. 11,367,199.

(51) Int. Cl.
*G06T 7/11* (2017.01)
*G06F 3/01* (2006.01)
(Continued)

(52) U.S. Cl.
CPC ............ *G06T 7/20* (2013.01); *G06F 3/013* (2013.01); *G06F 3/04845* (2013.01); *G06N 3/02* (2013.01);
(Continued)

(58) Field of Classification Search
CPC ........ G06V 20/49; G06V 20/41; G06V 10/82; G06V 10/25; G06V 20/46; G06V 2201/07;
(Continued)

(56) References Cited

U.S. PATENT DOCUMENTS 9,626,584 B2    4/2017   Lin et al.
10,867,422 B2   12/2020  Zhang et al.
(Continued)

OTHER PUBLICATIONS

Chen, J., et al., "Automatic Image Cropping: A Computational Complexity Study", In Proceedings of the IEEE Conference on Computer Vision and Pattern Recognition, pp. 507-515 (2016).
(Continued)

*Primary Examiner* — Quan M Hua
(74) *Attorney, Agent, or Firm* — Shook, Hardy & Bacon L.L.P.

(57) ABSTRACT

Systems and methods provide editing operations in a smart editing system that may generate a focal point within a mask of an object for each frame of a video segment and perform editing effects on the frames of the video segment to quickly provide users with natural video editing effects. An eye-gaze network may produce a hotspot map of predicted focal points in a video frame. These predicted focal points may then be used by a gaze-to-mask network to determine objects in the image and generate an object mask for each of the detected objects. This process may then be repeated to effectively track the trajectory of objects and object focal points in videos. Based on the determined trajectory of an object in a video clip and editing parameters, the editing engine may produce editing effects relative to an object for the video clip.

20 Claims, 9 Drawing Sheets

(51) Int. Cl.
  *G06F 3/04845* (2022.01)
  *G06N 3/02* (2006.01)
  *G06T 7/00* (2017.01)
  *G06T 7/20* (2017.01)
  *G06T 11/60* (2006.01)
(52) U.S. Cl.
  CPC ............ *G06T 7/0012* (2013.01); *G06T 11/60* (2013.01); *G06T 2207/10016* (2013.01); *G06T 2207/20084* (2013.01); *G06T 2207/30041* (2013.01)
(58) Field of Classification Search
  CPC .... G06V 20/40; G06V 10/255; G06V 40/193; G06V 10/26; G06V 10/774; G06V 10/62; G06V 10/761; G06V 10/762; G06V 10/764; G06V 10/993; G06V 20/10; G06T 2207/10016; G06T 2207/20084; G06T 2207/20081; G06T 2207/20132; G06T 7/194; G06T 7/11; G06T 7/155; G06T 9/002; G06T 11/60; G06T 2207/20104; G06T 2207/30041; G06T 7/0012; G06T 7/10; G06T 7/20
  See application file for complete search history.

(56) References Cited

U.S. PATENT DOCUMENTS

| | | | |
|---|---|---|---|
| 11,367,199 B2* | 6/2022 | Zhang | G06N 3/02 |
| 2006/0215752 A1* | 9/2006 | Lee | H04N 7/147 375/240.08 |
| 2012/0281127 A1 | 11/2012 | Marino et al. | |
| 2016/0063303 A1 | 3/2016 | Cheung et al. | |
| 2017/0324624 A1* | 11/2017 | Taine | H04L 67/535 |
| 2017/0324785 A1* | 11/2017 | Taine | H04L 51/043 |
| 2019/0026864 A1 | 1/2019 | Chen et al. | |
| 2020/0143171 A1* | 5/2020 | Lee | G06V 20/49 |
| 2021/0056661 A1 | 2/2021 | Holmes et al. | |
| 2021/0218929 A1* | 7/2021 | Huynh Thien | H04N 21/23418 |

OTHER PUBLICATIONS

Everingham, M., and Winn, J., "The Pascal Visual Object Classes Challenge", International journal of computer vision, pp. 1-23 (2007).

Jain, S., D., et al., "FusionSeg: Learning To Combine Motion And Appearance For Fully Automatic Segmentation Of Generic Objects In Videos", In IEEE conference on computer vision and pattern recognition (CVPR), pp. 3664-3673 (2017).

Jiang, L., et al., "DeepVS: A Deep Learning Based Video Saliency Prediction Approach", In Proceedings of the european conference on computer vision (ECCV), pp. 1-16 (2018).

Jiang, M., et al., "SALICON: Saliency In Context", In Proceedings of the IEEE conference on computer vision and pattern recognition, IEEE, pp. 1072-1080 (2015).

Li, B., et al., "High Performance Visual Tracking With Siamese Region Proposal Network", In Proceedings of the IEEE conference on computer vision and pattern recognition, pp. 8971-8980 (2018).

Li, B., et al., "Siamrpn++: Evolution Of Siamese Visual Tracking With Very Deep Networks", In Proceedings of the IEEE/CVF Conference on Computer Vision and Pattern Recognition, pp. 4282-4291 (2019).

Lu, X., et al., "See More, Know More: Unsupervised Video Object Segmentation With Co-Attention Siamese Networks", In Proceedings of the IEEE/CVF Conference on Computer Vision and Pattern Recognition, pp. 3623-3632 (2019).

Perazzi, F., et al., "A Benchmark Dataset And Evaluation Methodology For Video Object Segmentation", In Proceedings of the IEEE conference on computer vision and pattern recognition, pp. 724-732 (2016).

Tan, M., and Le, Q., V., "Efficientnet: Rethinking Model Scaling For Convolutional Neural Networks", In 36th International Conference on Machine Learning, PMLR, pp. 1-10 (2019).

Wang, Q., et al., "Fast Online Object Tracking And Segmentation: A Unifying Approach", In Proceedings of the IEEE/CVF Conference on Computer Vision and Pattern Recognition, pp. 1328-1338 (2019).

Wang, W., et al., "Learning Unsupervised Video Object Segmentation Through Visual Attention", In Proceedings of the IEEE/CVF Conference on Computer Vision and Pattern Recognition, pp. 3064-3074 (2019).

Wang, W., et al., "Revisiting Video Saliency: A Large-Scale Benchmark And A New Model", In Proceedings of the IEEE Conference on Computer Vision and Pattern Recognition, pp. 4894-4903 (2018).

Wang, W., et al., "Zero-Shot Video Object Segmentation Via Attentive Graph Neural Networks", In Proceedings of the IEEE/CVF International Conference on Computer Vision, pp. 9236-9245 (2019).

Wei, Z., et al., "Good View Hunting: Learning Photo Composition From Dense View Pairs", In Proceedings of the IEEE Conference on Computer Vision and Pattern Recognition, pp. 5437-5446 (2018).

* cited by examiner

SYSTEM FOR AUTOMATIC OBJECT MASK AND HOTSPOT TRACKING

CROSS-REFERENCE TO RELATED APPLICATION

This non-provisional patent application is a continuation of and claims priority to U.S. non-provisional patent application Ser. No. 16/900,483, filed Jun. 12, 2020, and titled "A System for Automatic Object Mask and Hotspot Tracking," the entire contents of which are incorporated herein by reference.

BACKGROUND

Users often rely on eye tracking to determine salient portions of frames of a video segment. Eye tracking software can support measuring a point where a user is looking based on motion of the user's eye(s) relative to the user's head. As identifying where a user is likely to focus their eyes can be useful in editing frames of a video with respect to frame composition and adding visual effects around an object in an image frame, determining salient portions of image frames is often an important part of a video editing project. For example, depending on the focal point of a video, the user may reframe frames of a video or video segment, add a visual effect (e.g., lens blur), remove an unwanted subject or irrelevant detail from an image, or change the aspect ratio of an image in order to improve the overall composition of the image.

SUMMARY

Various aspects of the technology described herein are generally directed to systems, methods, and computer storage media, for among other things, improving video editing operations (e.g., crop, zoom, pan, automatic focus, lens blur, object tagging) based on object detection and tracking in a video. In this regard, a video may be accessed and object attributes (e.g., hotspot, bounding box, mask, trajectory) may be determined by a neural network. Based on these object attributes, objects in the video may be identified and tracked. Further, using the object attributes of the identified objects, frames of the video may be automatically edited in a video editing system.

In particular, an editing engine of the video editing system in a computing environment processes videos or video clips (e.g., segments of a video) using tracked attributes that are extracted from image frames of the videos. For example, an eye-gaze network trained to detect the location of a salient portion of an image may produce a hotspot map of predicted focal points in a video frame. These predicted focal points may then be used by a gaze-to-mask network, trained to detect objects based on an image and predicted focal points of the image, to determine objects in the image and generate an object mask for each of the detected objects. This process may then be repeated to effectively track the trajectory of objects and object focal points in videos. The editing engine may further receive editing parameters (e.g., start frame, zoom scale, blur effect, reframing effect, object tag) from a crop suggestion module and a user interface. For example, the crop suggestion module may automatically generate a start/end frame (e.g., based on composition, crop scale and/or aspect ratio) or a user may select a start/end frame via a user interface. Based on the determined trajectory of the object in the video clip and the editing parameters, the editing engine may apply various effects and use reframing logic (e.g., a cropping algorithm) to produce temporally consistent editing and reframing effects for the video clip. For example, the editing engine may zoom, pan, or crop frames of a video or add a tag to an object relative to movements of a salient region of the object in the video to add an effect each frame of the video. Advantageously, the systems, methods, and computer storage media described herein are object aware and, as such, video edits may smoothly transition between the start and end frames.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
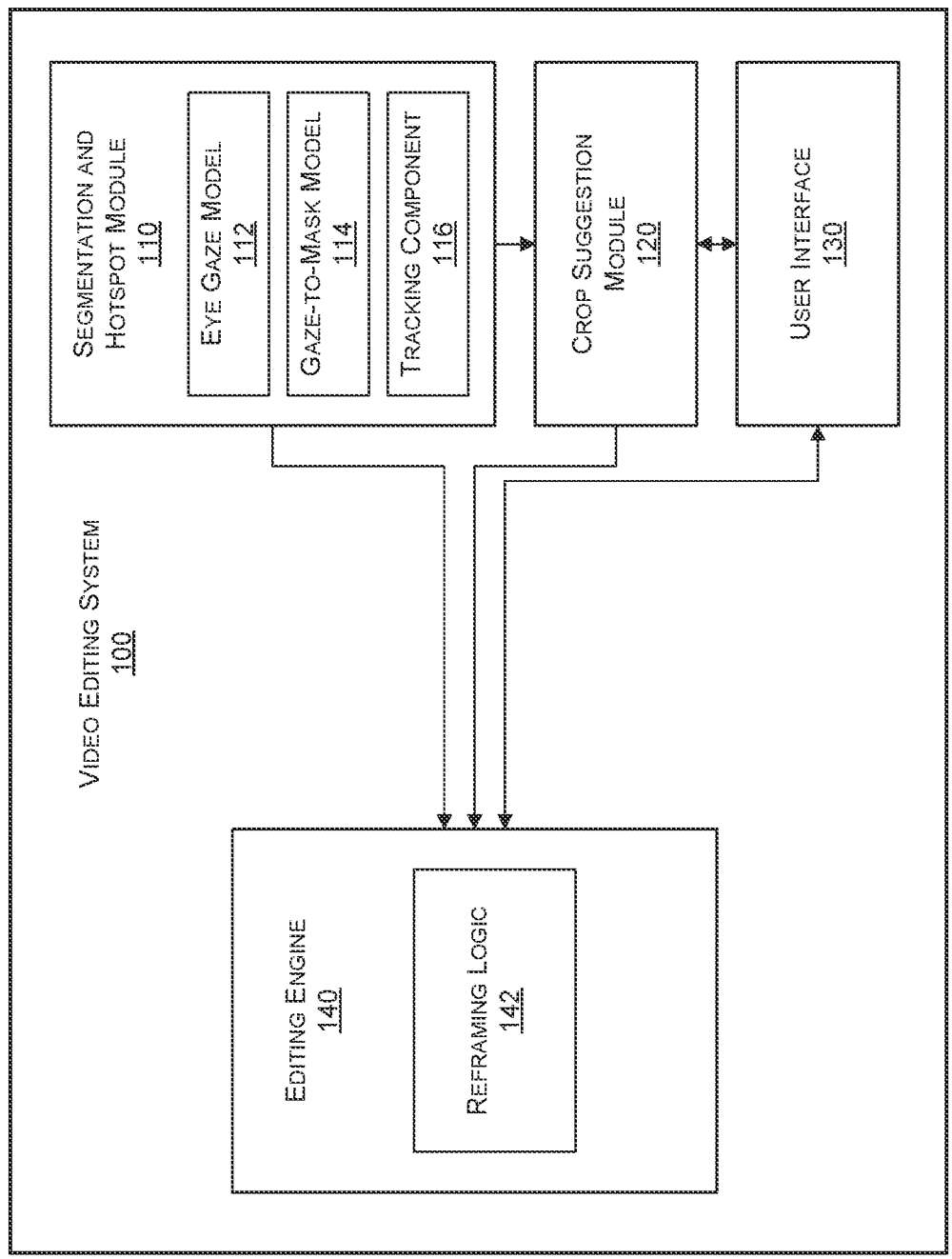
FIG. 1 illustrates an exemplary technical solution environment suitable for implementing embodiments a video editing system of the present invention.

The following detailed description describes technologies for the use of editing operations in a smart editing system that may generate a focal point within a mask of an object for each frame of a video segment and for editing frames of the video segment to quickly provide users with natural video modifications. The present invention has been described in relation to particular embodiments, which are intended in all respects to be illustrative rather than restrictive. Alternative embodiments will become apparent to those of ordinary skill in the art to which the present invention pertains without departing from its scope.

By way of further background, editing images can be used to bring attention to (e.g., accentuate or isolate) subject matter from its background. Depending on a desired emphasis and composition, image processing techniques may be used to edit images by cropping, zooming, changing an aspect ratio, focusing, adding visual elements or the like.

Extending image processing techniques to videos is difficult because performing specific editing operations on thousands of video frames is tedious and time consuming. Moreover, manually editing each video frame independently while maintaining a desired composition for an object in the video often leads to temporal inconsistencies (e.g., harsh changes in a cropping box of a video), which can be very eye-catching and irritating to viewers. These temporal inconsistencies are often caused by the loss of coherence between neighboring frames as a result of editing videos frame by frame.

Conventional video processing software applications that support editing images are not content aware and cannot accurately edit the image as content (e.g., an object or portion of an object) moves throughout the canvas of the frame. In one conventional implementation, software relies on users to identify key content to preserve in a video. For example, in such a conventional system, a user selects an object at various points in a video and the video can be cropped to keep the object in the frame of the video based on the user selection. However, such conventional systems are limited in that they require a user to observe the video and identify important content across many video frames, which is incredibly time consuming and can lead to inaccuracies. Additionally, these systems are generally limited to placing an object tag or a crop box relative to the location of the user selection or a center-point of an object mask. Such systems rely on substantial user input to determine a salient portion of a video frame. While some systems may rely on eye tracking to determine areas of interest, outputs from human eye tracking are often noisy and may not reliably identify an object of interest in the video segment.

Moreover, these conventional systems often require a user to select key frames for cropping. Such a conventional system then performs a simple linear interpolation between the key frames, which does not take into account an object location within the frames. Instead, conventional systems often rely on a user to track the object within frames of a video segment and identify the key frames to generate a reframing effect.

In other conventional systems for object tracking, a user draws a bounding box around an object in an initial frame in order for the system to know what object in a video segment is important. These systems are limited in that the user must view the video segment and make some determination as to what object is important in the video. Additionally, this limitation of conventional systems only allows for offline object detection and tracking because the user must view the video and determine important regions of a video frame.

Accordingly, embodiments of the present invention are directed to streamlined and efficient methods, systems, and computer storage media for improving video editing operations (e.g., crop, zoom, pan, focus and other visual effects) by determining location attributes of objects in a video (e.g., hotspot, bounding box, mask, trajectory) and automatically editing video frames in a video editing system based on parameters for editing the video frames and the determined location attributes of the objects (e.g., hotspot, bounding box, mask, trajectory) in a computing environment. Specifically, an editing engine of the video editing system in a computing environment may process videos or video clips (e.g., segments of a video) using a segmentation and hotspot module to determine a salient region of an object, generate a mask of the object, and track the trajectory of an object in the video clips. The editing engine may then receive editing parameters from a crop suggestion module and a user interface. Based on the determined trajectory of the object in the video clip and the editing parameters, the editing engine may apply various effects and use reframing logic (e.g., a cropping algorithm) to produce temporally consistent editing effects for the video clip. Advantageously, clean and stable intra-object focal point estimations of an object salient region may be obtained and used to track an object across time without the need for user input. In contrast, some conventional systems for recording human attention rely on eye tracking, which produces an eye-gaze distribution across an entire frame due to the difficulty for humans to constrain eye-gaze within an object. Thus, these conventional systems produce results that are exceptionally large and are unable to indicate an object location.

Embodiments of the present invention are further directed to streamlined and efficient methods, systems, and computer storage media for improving object detection and tracking in frames of a video segment by automatically determining focal points of video frames, generating an object mask for detected objects in the video frames and tracking the objects throughout the frames of the video segment. Specifically, an eye-gaze network trained to detect a salient portion of an image may produce a hotspot map of predicted focal points in the image. For example, the image may be encoded to a compact representation of the image to extract image features (e.g., spatial information) and then a plurality of decoder blocks may decode the image to generate the hotspot map. Advantageously, the eye-gaze network allows for obtaining a stable intra-object focal point distribution for a target object in a video.

Further, the hotspot map, combined with the image, may then be used by a gaze-to-mask network to detect objects in the image and produce a mask for each of the detected objects. Specifically, a gaze-to-mask network trained to detect objects based on image and a hotspot map of the image may determine objects in the image and generate an object mask for each of the detected objects. For example, a concatenation of the image and the associated hotspot map may be encoded to a compact representation of the concatenation of the image and the associated hotspot map to extract image features. A plurality of decoder blocks may then decode the concatenation of the image and the associated hotspot map to identify objects and generate an object mask for each of the identified objects. As some information may be lost during the encoding process, such as spatial information, a plurality of residual skip links may aid in recovering lost information by passing information from a plurality of encoder blocks to the plurality of decoder blocks during a decoder up-sampling operation. Additionally, a plurality of eye-gaze skip links may pass information from the hotspot map to the plurality of decoder blocks. Advantageously, the plurality of residual skip links and eye-gaze skip links may aid the decoder in accurately identifying the object of interest in the image.

A tracking component may support generating a hotspot map and object mask for each frame of a video segment. For example, to produce a tracked video segment, the tracking component may first receive an initial frame of a video segment from the eye-gaze network and the gaze-to-mask network. Based on the initial frame, the tracking component may employ a neural network (e.g., such as SiamRPN) to generate a bounding box for a target object in the initial frame and to crop the initial frame according to the bounding box. The cropped frame may then be used by the tracking component to identify a hotspot map and object masks for each frame of the video segment. Based on the identified hotspot map and object mask for each frame of the video segment, the location of the object may be tracked in the video segment. Advantageously, by tracking the object rather than tracking pixels, object deformations and movements are more accurately tracked. Additionally, by tracking the object within a cropped frame rather than the full frame, the resolution of the object is less influenced by the image background of the object and, as such, the object retains more detail.

Having briefly described an overview of aspects of the present invention, various terms used throughout this description are provided. Although more details regarding various terms are provided throughout this description, general descriptions of some terms are included below to provider a clearer understanding of the ideas disclosed herein:

Focal points are central or principal points of focus where a user may focus their attention. For example, a user viewing an image that includes a bicycle rider may focus their vision on the face of the bicycle rider. In this example, the position of the face of the bicycle rider in the image is a focal point of the image.

Objects are anything that is visible in an image and has a relatively stable form. In general, as used herein, objects are separate and distinct from a background of an image and may move relative to the background of the image. For example, in an image of a car on a roadway, the car is considered an object of the image and the roadway is considered the background of the image.

Hotspots are intra-object focal points for a target object that are produced by a neural network trained to predict salient portions of an image. For example, the hotspot for an image of a dancing woman may be the face of the dancing woman if the neural network determines that the face of the dancing woman is the point in the image that is most likely to be focused on by a user.

Hotspot maps are image frames that correspond to original image frames that indicate the location of salient portions (e.g., hotspots) of the original image frames. For example, an original image of a camel may have a corresponding hotspot map that indicates the salient portion of the original image of the camel is the head of the camel. The hotspot map may be generated by an eye-gaze model or may be user-defined. The hotspot map may be overlaid on the original image or may be provided independently of the original image. Further, the hotspot map may predict a single focal point or multiple focal points within a frame, depending on the image.

A mask (e.g., object mask) identifies pixels of an object in an image to distinguish the object from the background of the image or other secondary elements of the image (e.g., producing a binary object mask). For example, a mask for an image of a camel in a zoo would comprise the pixels that produce the image of the camel.

Editing parameters are variables associated with subprograms of the video editing system (e.g., image crop, zoom, blur effect, focus, etc.) that may be given specific values during the execution of a subprogram. For example, a user may select a blur effect subprogram to apply to a video segment and may specify parameters for a level of blur. Further, editing parameters may be modified by the video editing system based on inputs from additional components of the system (e.g., eye-gaze model, gaze-to-mask model, crop suggestion module, etc.) and/or to account for object movement within frames of a video segment.

Object trajectory is the line of travel of an object across a plurality of image frames of a video segment. The trajectory may be sequentially determined based on post-processing operations or predicted based on a trained neural network.

Object tags are visual graphics or text that can be added to frames of a video segment. The Object tags are associated with objects in the video segment and follow the object based on the object trajectory, hotspot, and object mask. For example, a user may add an object tag with an athlete's name to a video segment of the athlete running across a field, such that the name of the athlete is displayed proximate the athlete as the athlete runs across the field.

Residual skip links are direct connections between layers of a neural network that skip at least one layer of the neural network to pass feature information to another layer.

A residual block is a cross-layer connector in which feature maps of different layers are subjected to feature map fusion processing. For example, a residual block may include two convolutional layers with a rectified linear activation function where the output of the block is combined with the unweighted input to the block via a residual skip link.

Aspects of the technical solution can be described by way of examples and with reference to FIG. 1. FIG. 1 illustrates an exemplary technical solution environment suitable for implementing embodiments of the present invention. Generally, the technical solution environment includes a video editing system for editing operations using an editing engine. With reference to the example illustrated in FIG. 1, the video editing system 100 includes a segmentation and hotspot module 110. The segmentation and hotspot module 110 includes an eye-gaze model 112, a gaze-to-mask model 114, and a tracking component 116. The system 100 also includes a crop suggestion module 120, operable to generate start/end frames of a video segment. The video editing system 100 also includes a user interface 130, operable to allow a user to define editing parameters, display video segments, and modified versions of video segments. The video editing system 100 also includes an editing engine 140, operable to produce a temporally consistent editing effects for a video segment. The editing engine 140 includes reframing logic 142, operable to maintain an object within a cropping box and adjust the coordinate position of the cropping box relative to a focal point (e.g., hotspot) and an object mask. The editing engine 140 may receive inputs from each of the segmentation and hotspot module 110, crop suggestion module 120, and the user interface 130. Further, outputs from the segmentation and hotspot module 110 may be communicated to the crop suggestions module 120. Outputs from the crop suggestion module 120 may be communicated to the user interface 130. Outputs from each of the user interface 130 and the editing engine 140 may be communicated with each other. Although the segmentation and hotspot module 110 is generally discussed herein as being associated with video editing system 100, in some cases, the segmentation and hotspot module 110, or some portion thereof, may additionally or alternatively be integrated into an operating system (e.g., as a service) or a server (e.g., a remote server), or into a stand-alone application.

The editing operations of the technical solution described herein support generating a focal point within a generated mask of an object for each frame of a video segment and editing frames of the video segment. Generally, the editing operations may be implemented using the present video editing system (i.e., segmentation and hotspot module 110, crop suggestion module 120, user interface 130, and editing engine 140), or portions thereof, that supports editing operations that are executed to generate, using an eye tracking neural network (e.g., eye-gaze model 112) and an object masking neural network (e.g., gaze-to-mask model 114), a focal point within a mask of an object for each frame of a video segment. Using the position of the focal point within the mask of the object, editing operations may be performed to add visual effects (e.g., blur effects, tags, or annotations) that move with the object in the frames of the video segment. For example, to focus a viewer's attention on an object in a video segment, a user may add a lens blur effect (e.g., bokeh—to emulate blur produced in out-of-focus parts of an image produced by a lens) to the background of an image frame. As the system 100 is object aware, the lens blur effect may render the object in-focus and render the background of the image frame around the object out-of-focus. The editing operations may be further executed to reframe each frame of the video segment based on the focal point within the mask of the object, the mask of the object, reframing suggestions and a set of user-defined parameters.

The segmentation and hotspot module 110 of the video editing system 100 may support determining attributes of an object (e.g., location, size, trajectory, focal point, object mask) and output these attributes to the editing engine. To determine object attributes, the segmentation and hotspot module may employ an eye-gaze model 112, a gaze-to-mask model 114, and a tracking component 116. The eye-gaze model 112 of the segmentation and hotspot module may be a neural network trained for predicting eye-gaze (e.g., eye tracking) to provide a prediction of a salient region of at least one object (i.e., a hotspot and/or hotspot map) in a frame of a video. Based on this prediction, the gaze-to-mask model 114 of the segmentation and hotspot module may receive the predicted salient region of the object from the eye-gaze model 112 and generate a mask for the object. Further, based on the hotspot and the object mask for an initial frame of a video segment, the tracking component 116 of the segmentation and hotspot module may process the video segment to determine a hotspot map and mask of the object in each frame of the video segment, effectively tracking the object across the frames of the video segment.

The eye-gaze model 112 of the segmentation and hotspot module 110 supports producing a hotspot map of a frame of a video. A hotspot is a salient portion of an image that is an intra-object focal point for a target object that is produced by a trained neural network. For example, the hotspot for an image of a dancing woman may be the face of the dancing woman if the neural network determines that the face of the dancing woman is the point in the image that is most likely to be focused on by a user. To generate this hotspot, the eye-gaze model 112 leverages an encoder to extract features from the image. As discussed in more detail in FIG. 4, the encoded image is then decoded using residual refinement blocks, up-sampling at each block, to produce a hotspot map. The hotspot map may predict a single focal point or multiple focal points within a frame, depending on the image. Additionally or alternatively, a user may wish to identify the salient region of the image. For example, the user may select a focal point in the image via the user interface 130 by clicking on an object. Further, a user may use an eye tracker to measure eye positions and eye movement to identify salient regions of the image. As used herein, a hotspot map may comprise predicted focal points generated by the eye-gaze model 112 or user-defined focal points selected via the user interface 130 or generated via an eye tracker. The present disclosure generally discusses exemplary embodiments in which a hotspot map is produced via eye-gaze model 112. However, the description exemplary embodiments are not intended to limit the scope of this patent. Rather, the inventors have contemplated that the claimed subject matter might also be embodied in other ways, to include different steps or combinations of steps similar to the ones described in this document.

In one exemplary embodiment of the eye gaze model 112, given an initial frame $I^0$ the eye-gaze model may produce an eye gaze estimation $E^0$ to indicate the location or focal point of a primary object in a video segment. Specifically, an encoder may extract features of the initial frame $I^0$. For example, the last three level features of the encoder may be used, which may be represented as $$F^E = \{F_J^E\}_{J=3}^{5}.$$

In a decoder, residual refinement blocks may be stacked to produce an eye gaze map in a coarse-to-fine manner, which may be represented as follows:

$$O_J^E = Conv^2\left(Cat\left(f_J^E, O_{J+1}^E\right)\right) + Up\left(O_{J+1}^E\right)$$

In the above equation, Up( ) may represent an upsampling operation with stride 2. Cat ( ) may represent a channel-wise concatenation operation. $Conv^2$ ( ) indicates an operation with two convolutional layers.

$$O_J^E$$

is an output of a current residual block. It should be noted that $$Up\left(O_{J+1}^E\right)$$

is ignored when j=5. An output from the eye gaze model may be taken from a final residual block as an eye gaze prediction $E^0$ (e.g., focal point or hotspot).

The gaze-to-mask model 114 of the segmentation and hotspot module 110 supports producing a mask of an object in a frame of a video. A mask (e.g., object mask) identifies pixels of an object in an image to distinguish the object from the background of the image or other secondary elements of the image (e.g., producing a binary object mask). For example, a mask for an image of a camel in a zoo would comprise the pixels that produce the image of the camel. To generate this mask, the gaze-to-mask model 114 may first receive an image that includes the camel, and a hotspot map of that image to identify the salient region of the image. The gaze-to-mask model 114 may then encode a concatenation (e.g., combination or integration) of the image and the hotspot map to extract features from the image and the hotspot map. Similar to the eye-gaze model 112, and as discussed in more detail in FIG. 5 and FIG. 6, the encoded concatenation is then decoded using residual refinement blocks, up-sampling at each block, to produce the object mask.

In an exemplary embodiment of the gaze-to-mask model 114, the gaze-to-mask model 114 may generate a mask $M^t$ for a target object based on an initial frame $I^0$ and corresponding an eye gaze estimation $E^0$ from the eye-gaze model 112 according to a highlighted region in a hotspot map corresponding to the eye gaze estimation $E^0$. Similar to the eye-gaze model, an encoder may extract features from the initial frame $I^0$ and corresponding an eye gaze estimation $E^0$. For example, extracting five level features may be represented as $$F^{G2M} = \{F_J^{G2M}\}_{J=1}^{5}.$$

Further, a revised residual block may add the hotspot map $E^r$ in the decoder architecture, which may be represented as follows:

$$O_J^{G2M} = Conv^2\left(Cat\left(f_J^{G2M}, O_{J+1}^{G2M}\right)\right) + Up\left(O_{J+1}^{G2M}\right)$$

In the above equation, $$O_J^{G2M}$$

represents the output of the revised residual block. It should be noted that the eye gaze estimation $E^0$ (e.g., hotspot map) may be resized according to a corresponding feature resolution. In a mask decoder, residual refinement blocks may be stacked and the output from a first block $$O_J^{G2M}$$

as an object mask $M^0$.

The tracking component 116 of the segmentation and hotspot module 110 supports generating a mask and hotspot map for each frame of a video segment, effectively tracking the object in the video segment. To produce a tracked video segment, the tracking component may first receive an initial frame of a video segment from the eye-gaze network and the gaze-to-mask network. Based on the initial frame, which includes an object mask, the tracking component may employ a neural network (e.g., such as SiamRPN) to generate a bounding box for a target object based on the object mask in the initial frame. The bounding box may then be used to crop the initial frame to a smaller size such that the object fills a substantial portion of the frame. The cropped initial frame may then be used as a template by the tracking component to generate bounding boxes, and corresponding cropped frames, for each frame of the video segment. The tracking component may then process these cropped frames to track the object in the video segment and to identify a hotspot map and object mask for each frame of the video segment. Advantageously, by tracking the object rather than tracking pixels, object deformations and movements are more accurately tracked. Additionally, by tracking the object within a cropped frame rather than the full frame, the resolution of the object is less influenced by the image background of the object and, as such, the object retains more detail.

Figure 7:
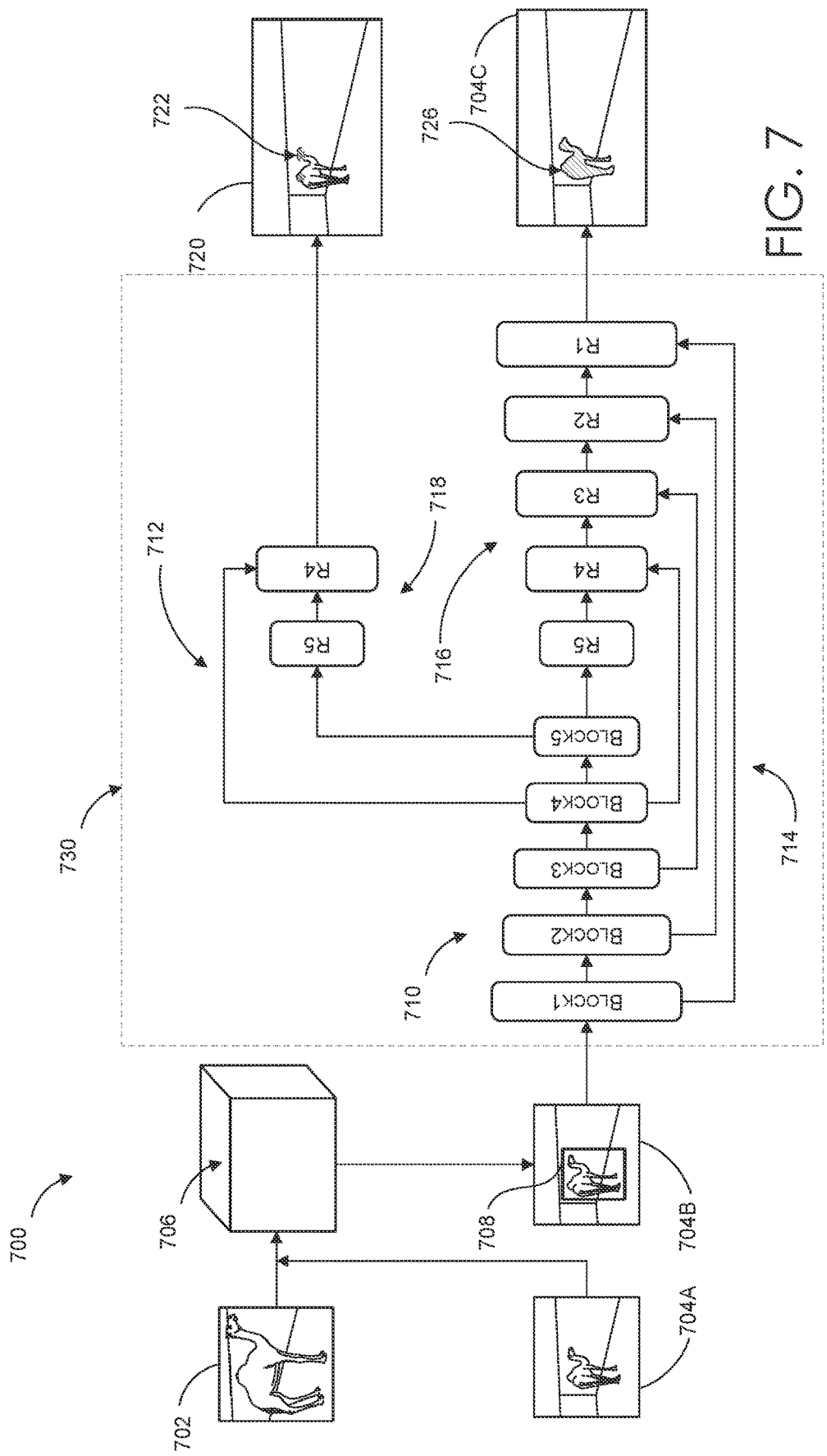
FIG. 7 illustrates an exemplary mask and hotspot tracking network, in accordance with embodiments of the present invention.

In an exemplary embodiment of the tracking component 116, the tracking component may use a bounding box of object mask $M^0$, which may be generated by the gaze-to-mask model 114, as a template for tracking the object in subsequent frames of a video segment. The tracking component may then receive each frame of the video segment and generate a bounding box $B_i$ for a target object. A mask and hotspot generation network of the tracking component may then produce a mask and hotspot map for the tracked object. Specifically, for a current image $I_i$, the bounding box $B_i$ may be used to generate a sub-region $I'_i$. The sub-region $I'_i$ may be sent to the mask and hotspot generation network to jointly generate object mask $M_i$ and hotspot map $H_i$. As can be seen in FIG. 7, the mask and hotspot generation network contains two parallel branches for mask and hotspot prediction, respectively. Similar to the encoder and decoder used in the eye gaze model 112, several residual blocks may be stacked to extract features for an input region. The architecture may be represented as follows:

$$O_J^{i,M} = Conv^2\left(Cat\left(f_J^{i,M}, Up\left(O_{J+1}^{i,M}\right)\right) + Up\left(O_{J+1}^{i,M}\right)\right)$$

In the above equation, $$O_J^{i,M}$$

represents an output in the j-th decoder residual block.

$$f_J^{i,M}$$

represents the j-th level feature in mask branch of the mask and hotspot generation network of the tracking component. The output from a first residual decoder block may be taken as a final object mask $M_i$ for the i-th frame of the video segment.

For hotspot prediction, residual blocks may also be implemented in the decoder, which may be represented as follows:

$$O_J^{i,H} = Conv^2\left(Cat\left(f_J^{i,H}, Up\left(O_{J+1}^{i,H}\right)\right) + Up\left(O_{J+1}^{i,H}\right)\right)$$

In the above equation, $$O_J^{i,H}$$

represents an output in the j-th decoder residual block and $$f_J^{i,H}$$

represents the j-th level feature in the hotspot branch of the mask and hotspot generation network of the tracking component. Generally, the output from a forth residual decoder block may be taken as a final hotspot $H_i$ for the i-th frame of the video segment. It should further be noted that the respective encoders for the mask and hotspot branches are not shared.

A loss function for the tracking component may be represented as L=Lscore+Lbox+Lmask+Lhot, where Lscore and Lbox may be the cross-entropy loss for classifying the bounding boxes and L1 loss for regression, respectively. Further, Lmask and Lhot may be the cross-entropy loss between predicted mask and hotspot map with a corresponding ground truth.

The crop suggestion module 120 of the video editing system 100 shown in FIG. 1 supports generating a start/end frame based on a combination of user inputs and machine learning. For example, a user may define a size (e.g., 50% of original) and an aspect ratio (e.g., 16:9) for a cropping box, and a machine learning module may generate a set of candidate crop boxes with composition scores for each candidate crop box. For example, as described in additional detail below in FIG. 2, the placement of the hotspot and the object mask within the frame of the crop candidate may be evaluated based on the rule of thirds, visual balance, region size, etc. Then, a crop box may be selected based on whichever crop box has the highest composition score. The candidate crop boxes may further be output to and displayed via user interface 130 to allow a user to select a preferred crop box.

The user interface 130 of the video editing system 100 allows a user to define editing parameters (e.g., blur effects, object tagging, cropping boxes, speed, aspect ratio, reframing effect) and provides at least an operation window, display window, progress slider, and operation controls. The operation window allows a user to interact with frames of a video. For example, a user may identify focal points or draw bounding boxes on frames of the video (e.g., start/end boxes for the video cropping process). The display window may display the video with a completed editing effect applied to a video segment. The progress slider may indicate the indexes of video frames (e.g., showing progress during video playback). The operation controls may provide indicators (e.g., showing status of video playback and reframing), playback controls, operation controls to set an initial editing status (e.g., start/end/zoom/mask), and list controls to allow users to select different settings for the editing process (e.g., speed/scale/aspect ratio/result).

The editing engine 140 of the video editing system 100 includes reframing logic 142, which may be used to produce consistent reframing effects on input videos. Reframing effects may remove some peripheral areas of a video frame (e.g., image background) using a cropping box to improve composition, change an aspect ratio, accentuate, or isolate an object from a background of the video frame. For example, a cropping box may pan across frames of a video segment, removing portions of the frames, to track an object and focus a viewer's attention on the object. Reframing effects may further include zoom out effects, which may add peripheral areas of a video frame. For example, a cropping box may increase in size during playback of a video segment to include more background elements not visible in an initial frame of the video segment. As indicated above, the editing engine 140 may receive editing parameters and object attributes from several components including segmentation and hotspot module 110, crop suggestion module 120, and user interface 130.

The reframing logic 142 may use inputs from the segmentation and hotspot module 110, crop suggestion module 120, and user interface 130 to maintain temporal consistency of cropping boxes relative to an object by using both the object's hotspot map and object mask from the segmentation and hotspot module 110 as reference points for the cropping box. Based on the position of the hotspot/mask and editing parameters from the user interface 130 and/or the crop suggestion module 120, the reframing logic 142 may define an offset with regards to the center of the hotspot and corners of a bounding box surrounding the object mask. For example, as the object location changes throughout frames of a video segment, an offset from the combination of reference points (i.e., hotspot map and mask) is used to keep track of the object and produce linear relative movements using the reframing logic.

Advantageously, the reframing logic will contain the object by the cropping box and the position of the object in the cropped video will have a smooth transition across all frames between start and end frames. Moreover, the reframing logic may optimize reframing composition by relying on the hotspot map and object mask as reference points, rather than relying on a single reference point for the object, as in some conventional systems.

The editing engine 140 may automatically apply editing effects to a video based on inputs to the reframing logic 142 from the segmentation and hotspot module 110, the crop suggestion module 120, and the user interface 130. By way of example, reframing effects may include, at least, automatic zoom, user-specified zoom, and retargeting. Automatic zoom may apply the reframing logic 142 to provide users with a simple way of producing zoom effects (e.g., zoom in and zoom out) based on specified parameters. For example, the editing engine may produce customized zoom effects based on receiving, via a user interface, a user-specified zoom scale and speed. User-specified zoom may apply the reframing logic 142 to allow users to define an aspect ratio and a start and/or end crop box for a reframing effect. For example, based on a start crop box of a start frame, an end crop box of an end frame of a video, and a user-specified aspect ratio for each crop box, the editing engine 140, using the reframing logic 142, may reframe each frame of the video to provide a smooth transition from the start crop box and aspect ratio to the end crop box and aspect ratio. In some embodiments, the aspect ratio may be automatically defined based on a resolution/aspect ratio of a display screen such that frames of a video segment may be reframed to retarget the object in the frame based on the resolution/aspect ratio. Additionally, this may be done while a reframing effect is performed by the editing engine.

Further, each of the reframing effects may be used to generate a video slide show where a selected retargeting effect may be used to produce smoothing transitions when switching between videos or video segments. The smoothing transitions may be user defined or may be automatically generated by the editing engine based on either inputs from the composition module or randomly generated crop boxes.

Figure 2:
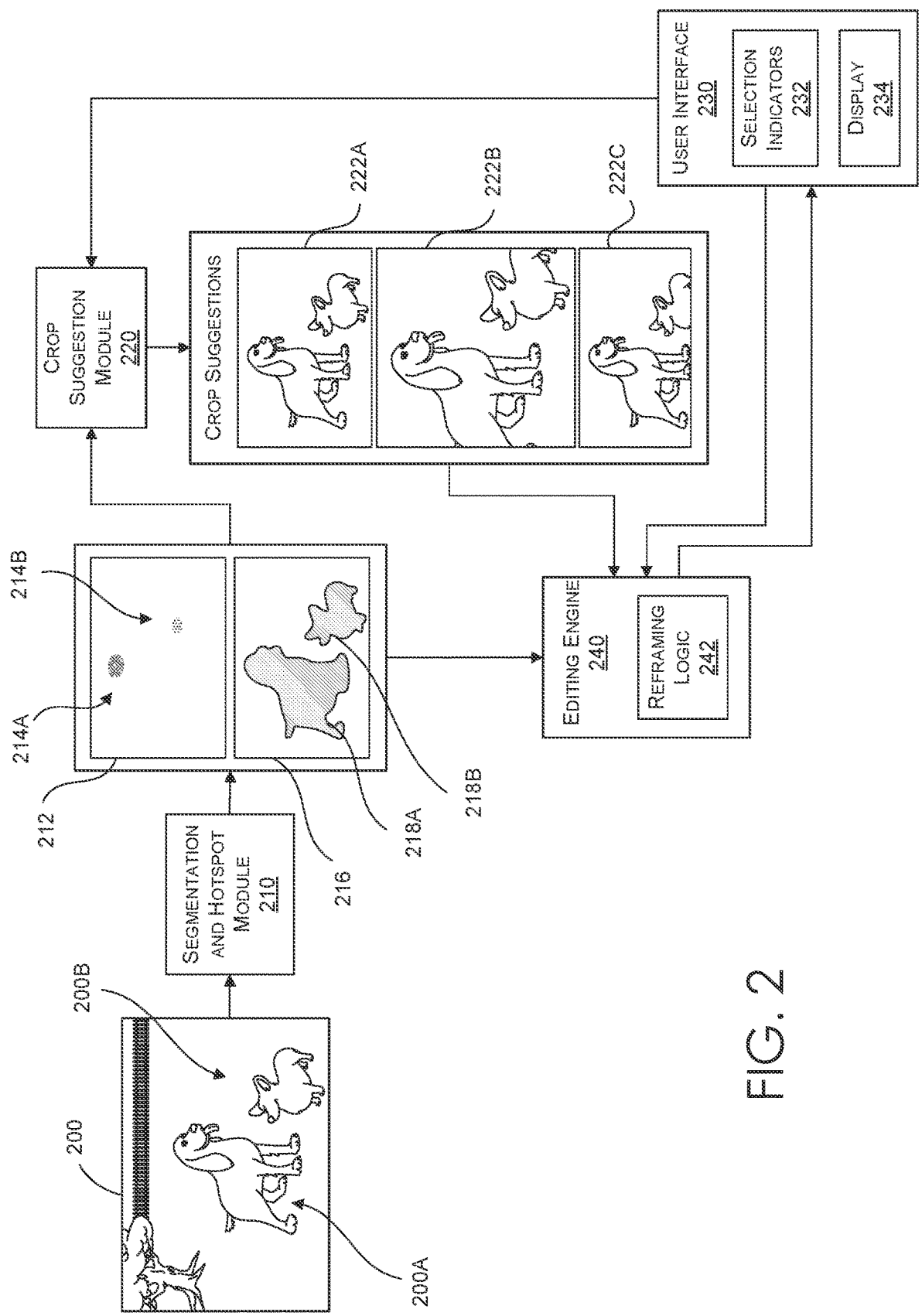
FIG. 2 illustrates an exemplary process for editing a video segment, in accordance with embodiments of the present invention.

With reference to FIG. 2, FIG. 2 illustrates an exemplary process for editing a video segment, in accordance with embodiments of the present invention. FIG. 2 shows an initial frame 200 of a video segment, segmentation and hotspot module 210, hotspot map 212 of the initial frame 200, object mask map 216 of the initial frame 200, crop suggestion module 220, crop suggestions (222A, 222B, and 222C), user interface 230 with selection indicators 232 and display 234, and editing engine 240 with reframing logic 242.

In operation, the segmentation and hotspot module 210 may receive the initial frame 200 of a video segment and process the initial frame 200 to produce a hotspot map 212 and object mask map 216 of the initial frame. For example, as can be seen in FIG. 2, the segmentation and hotspot module 210 may produce hotspot map 212 with identified hotspots 214A and 214B, where hotspot 214A corresponds to the head of the dog 200A in the initial frame 200 and hotspot 214B corresponds to the head of the dog 200B in the initial frame 200. Further, based on hotspots 214A and 214B, the segmentation and hotspot module 210 may produce object mask map 216 with masks 218A and 218B, where mask 218A corresponds to the overall shape of dog 200A and mask 218B corresponds to the overall shape of dog 200B.

In some embodiments, the hotspot map 212 and the object mask map 216 may be output to the crop suggestion module 220 to produce a set of crop suggestions (e.g., 222A, 222B, 222C). The crop suggestion module 220, using a neural network (e.g., DCNN—"Deep Convolutional Neural Network"), may generate a set of crop candidates for reframing the initial frame 200 and/or an end frame of a video segment based on user-specified parameters (e.g., aspect ratio and scale) received from the user interface 230 via selection indicators 232. The set of crop candidates may then be evaluated by the crop suggestion module 220 based on the frame composition relative to the hotspot map 212 and the object mask map 216 to determine which crop candidates provide the best frame composition. For example, to evaluate crop candidates, each candidate of the pool of crop candidates may be filtered based on determining whether the hotspot (e.g., 214A and 214B) and object mask (e.g., 218A and 218B) are included in the crop and where the hotspot and object mask are located within the crop. Based on where the hotspot and object mask are located within each candidate crop, each candidate crop may be assigned a composition score. A composition score may be calculated based on a combination of several techniques. For example, a rule of thirds technique may find the center of gravity of an object based on a hotspot map and an object mask and evaluate a candidate crop box based on the position of the center of gravity of the object relative to the crop box. A triangle composition technique may discover a smallest triangle which can enclose the center of gravity of the object. A vanishing point technique may search an intersection point with the highest number of lines. A frame within a frame technique may calculates a rectangular area of the background. An intensity balance technique may compare a difference of gray scale values between a right-half image and a left-half image. Each composition method may generate a corresponding score, which may be summed and/or weighted to generate a composition score for each candidate crop box. Further, each candidate may be filtered based on the assigned composition scores. Based on the results of the filtering process, a set of crop suggestions with the highest candidate score may be generated and output to the editing engine 240 and the user interface 230. Advantageously, a user may only be presented with crops which exhibit preferable placement of the objects within the crop box.

The editing engine 240 may receive the hotspot map 212, the object mask 216, crop suggestions (222A, 222B, and 222C), and user-specified parameters (e.g., aspect ratio and scale) received from the user interface 230 via selection indicators 232. Using the reframing logic 242, the editing engine 240 may produce a temporally consistent reframing effect for the video clip. For example, frames of the video segment may be cropped to perform a zoom effect that begins with the initial frame 200, which includes more background elements of the image, and ends with crop suggestion 222A, which focuses on the pair of dogs (200A and 200B) and excludes background elements. Based on cropping frames of the video segment, a new version of the video segment may be produced which includes the zoom effect. The new version of the video segment may then be displayed on display 234 of the user interface. The original version of the video segment and the new version of the video segment may be displayed next to each other in a single display window to allow a user to view the original video segment and the new video segment side-by-side. Advantageously, a user may compare the two video segments to evaluate whether the reframing effect has produced a new video segment that is acceptable for the user.

Figure 3:
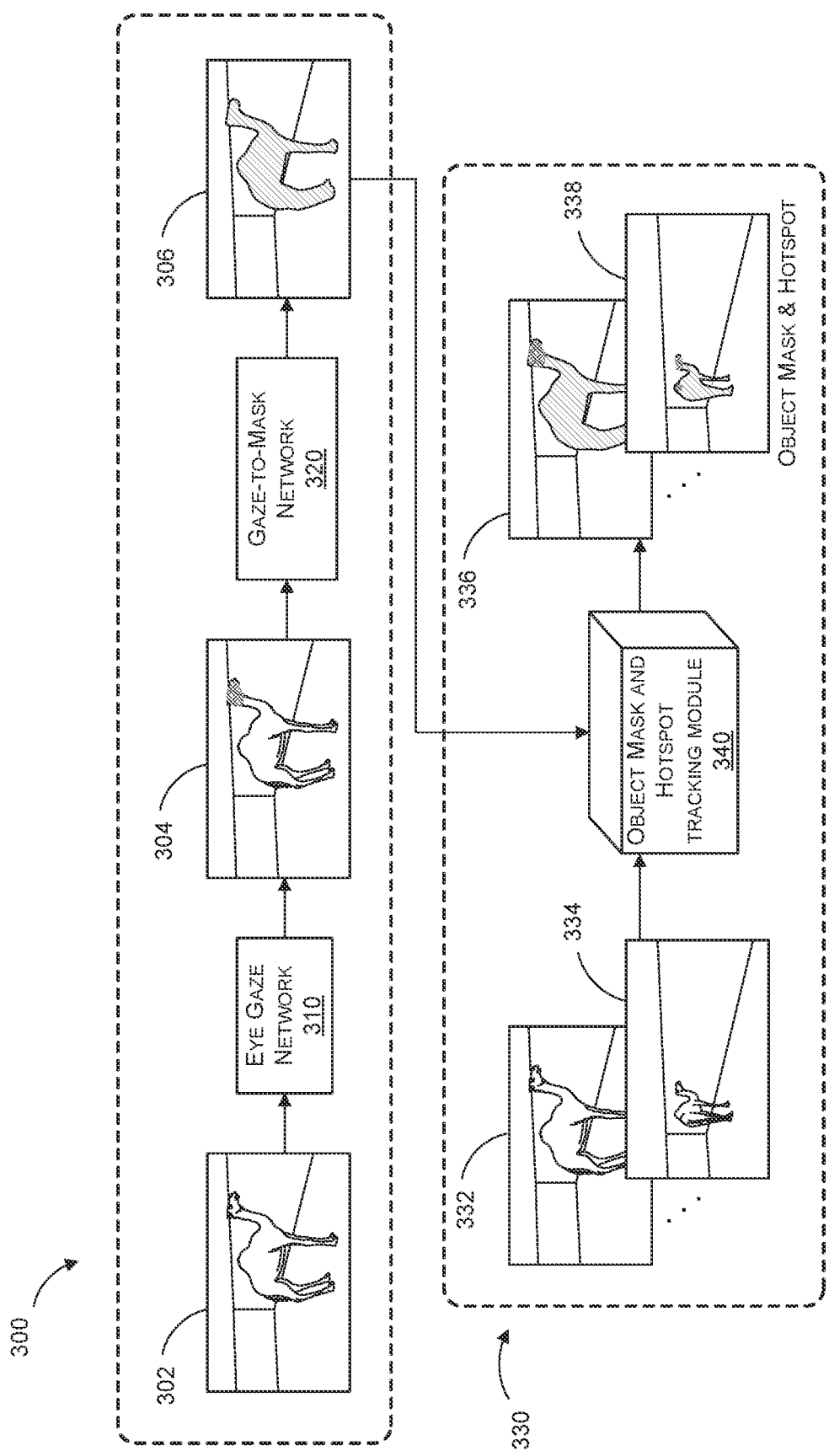
FIG. 3 illustrates an object mask and hotspot tracking process, in accordance with embodiments of the present invention.

With reference to FIG. 3, FIG. 3 illustrates the object detection process 300 and hotspot and mask tracking process 330, in accordance with embodiments of the present invention. In operation, an initial frame 302 of a video segment may be provided to eye-gaze network 310 to produce a hotspot map 304, indicating a predicted intra-object focal point (e.g., hotspot) of the initial frame 302. The intra-object focal point effectively identifies an object of interest in the initial frame. The hotspot map 304 may then be provided to the gaze-to-mask network 320. The gaze-to-mask network 320 may produce an object mask 306 based on the hotspot map 304, indicating the shape of the object that was identified by the eye-gaze network 304.

The hotspot and mask tracking process 330, in operation, may receive a video segment 334, an initial frame 332 (which is the same as initial frame 302 above) of the video segment 334, and object mask 306 at an object mask and hotspot tracking module 340. The object mask and hotspot tracking module 340 may track an object in the video segment 334 based on generating bounding boxes for each frame of the video segment and predicting an object mask and a hotspot map for each of the frames of the video segment. For example, a hotspot and mask frame 336 corresponding to the initial frame 332 may be generated. Moreover, a hotspot and mask video segment 338 corresponding to video segment 334 may be generated. Advantageously, identifying a hotspot map and an object mask for each frame of a video segment allows a range of video editing operations to be applied to the video segment, such as, for example, automatic zoom, video cropping, automatic focus, object tagging and retargeting.

Figure 4:
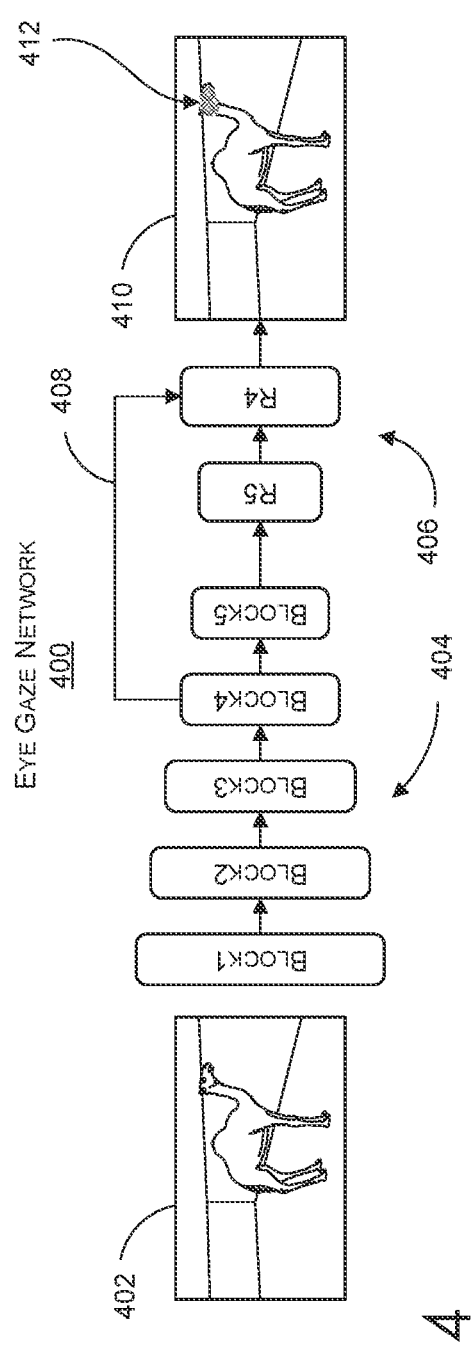
FIG. 4 illustrates an exemplary eye-gaze network for generating a hotspot of an object, in accordance with embodiments of the present invention.

FIG. 4 illustrates additional technical details of an exemplary eye-gaze network architecture for generating a hotspot (e.g., predicted intra-object focal point) of an object, in accordance with embodiments of the present invention. The eye-gaze network 400 may be a neural network (e.g., a convolutional neural network—CNN) trained to extract features of an image and identify a salient portion of the image (e.g., an intra-object focal point) based on eye-gaze estimations. The exemplary eye-gaze network 400 includes a plurality of encoder blocks 404, a plurality of decoder blocks 406, and a residual skip link 408. In operation, the initial frame 402 is encoded by the plurality of encoder blocks 404 to extract image features (e.g., spatial information) from the initial frame 402. After the initial frame 402 has been encoded to a compact representation of the initial frame 402, the plurality of decoder blocks 406 may decode the initial frame 402 to generate a hotspot map 410 with an identified hotspot 412. Each of the plurality of decoder blocks may be configured as a residual block, as described in FIG. 6 below. As some information may be lost during the encoding process, such as spatial information, residual skip link 408 may aid in recovering lost information by passing information from an encoder block to a decoder block during a decoder up-sampling operation. Advantageously, this exemplary architecture allows for the neural network of eye-gaze network 400 to use multiple convolutional layers while maintaining a quality decoded image.

Figure 5:
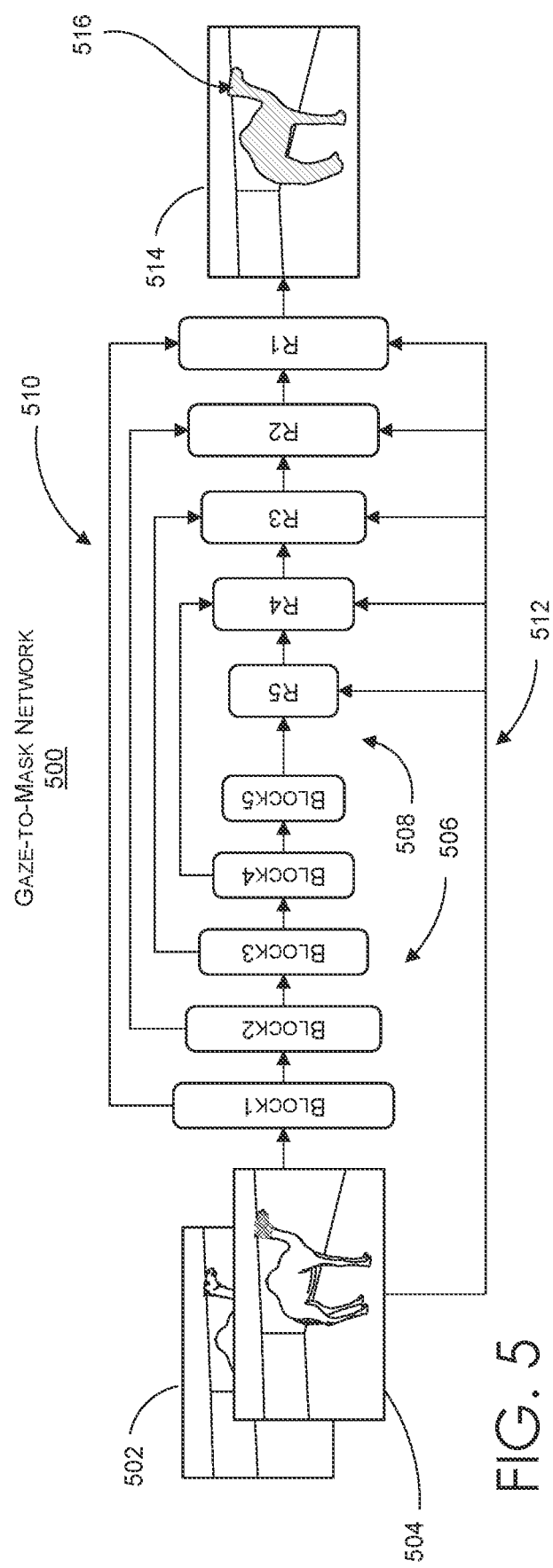
FIG. 5 illustrates exemplary gaze-to-mask network for generating an object mask, in accordance with embodiments of the present invention.

Turning to FIG. 5, FIG. 5 illustrates an exemplary gaze-to-mask network architecture for generating an object mask, in accordance with embodiments of the present invention. The gaze-to-mask network 500 may be a neural network (e.g., a convolutional neural network—CNN) trained to extract features of an image and generate an object mask of an object in the image based on the extracted features and a hotspot map received from the eye-gaze network 400 of FIG. 4. The exemplary gaze-to-mask network 500 includes a plurality of encoder blocks 504, a plurality of decoder blocks 506, a plurality of residual skip links 508, and a plurality of eye-gaze skip links 512.

In operation, a concatenation of the initial frame 502 and eye-gaze map 504 is encoded by the plurality of encoder blocks 506 to extract image features (e.g., spatial information) from the initial frame 502 and the eye-gaze map 504. After these image features have been encoded to a compact representation of the initial frame 502 and the eye-gaze map 504, the plurality of decoder blocks 508 may decode the initial frame 502 and the eye-gaze map 504 to generate an object mask frame 514 with an identified object mask 516. Each of the plurality of decoder blocks may be configured as a residual block, as described in FIG. 6 below. As some information may be lost during the encoding process, such as spatial information, the plurality of residual skip links 510 may aid in recovering lost information by passing information from the plurality of encoder blocks 506 to the plurality of decoder blocks 508 during a decoder up-sampling operation. Additionally, eye-gaze information may be passed from the eye-gaze map 504 to the plurality of decoder blocks 508 via the plurality of eye-gaze skip links 512. As such, the output from each of the decoder blocks of the plurality of decoder blocks 508 produces finer detail when compared to the previous block. Advantageously, the plurality of skip links 512 aid the decoder in accurately identifying the object of interest in the initial frame 502. In particular, conventional systems often fail when multiple objects are identified in the hotspot map. By passing the eye-gaze information to the decoder blocks 508 via the plurality of eye-gaze skip links 512, the gaze-to-mask network 500 more accurately generates an object mask for one or more objects. As can be seen by comparing the plurality of decoder blocks 406 in FIG. 4 to the plurality of decoder blocks 508 in FIG. 5, the gaze-to-mask network 500 may include more decoder blocks than the eye-gaze network 400. In general, fewer decoder blocks may be used to generate a hotspot map because a full resolution image is not necessary in order to generate an accurate hotspot map. However, in contrast, a full resolution image is preferable for generating an accurate object map.

Figure 6:
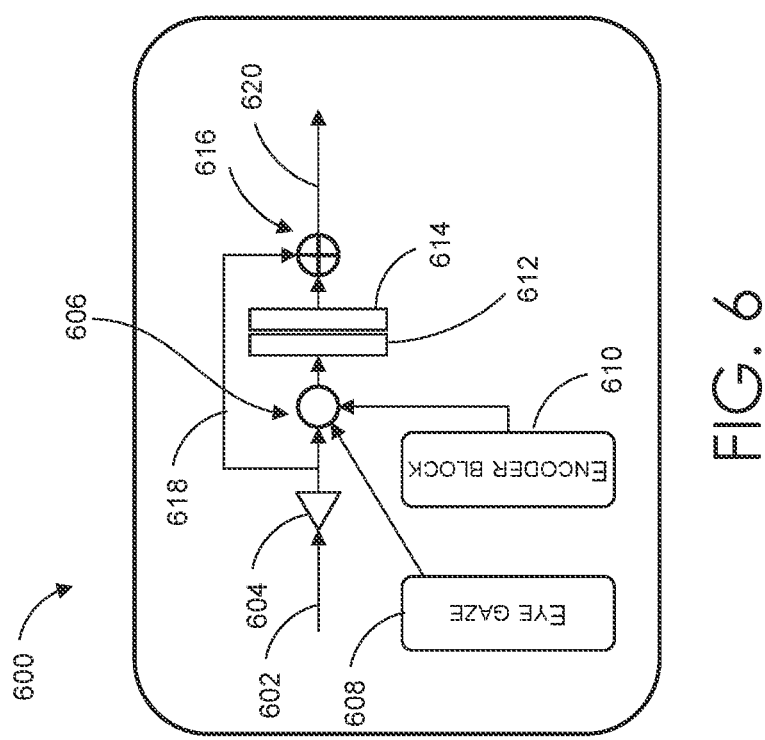
FIG. 6 illustrates an exemplary residual block of the eye-gaze network and gaze-to-mask network, in accordance with embodiments of the present invention.

Turning to FIG. 6, FIG. 6 illustrates an exemplary residual block architecture for generating an up-sampled output of an encoded image, in accordance with embodiments of the present invention. The exemplary residual block 600, which corresponds to the decoder blocks shown in FIGS. 4 and 5, may perform several operations, including an up-sampling operation 604, a concatenation operation 606, a dimension reduction operation 612, a channel prediction operation 614, and a sum operation 616.

In operation, to generate an up-sampled output 620, the residual block 600 may first receive an output 602 from a previous encoder or decoder block and perform up-sampling operation 604 to increase image resolution. The concatenation operation 606 may then receive, as inputs, an output from the up-sampling operation 604, eye-gaze information 608 (e.g., via one of the plurality of eye-gaze skip links 512 in FIG. 5), and image information (e.g., via one of the plurality of residual skip links 510 in FIG. 5) to integrate the inputs. Dimension operation 612 may then be performed on the integrated inputs to reduce the dimensionality of the encoded image in order to identify and select relevant image features. A combination of dimensionality reduction methods may be used herein (e.g., Multi-dimensional scaling, Linear Discriminant Analysis, Isometric Feature Mapping, Locally Linear Embedding, Hessian Eigenmapping, Spectral Embedding, Principal Component Analysis, Factor Analysis, Autoencoder, etc.). A subsequent channel prediction operation 614 may be performed on the integrated inputs using the selected relevant image features. The channel prediction operation 614 may encode the presence or absence, and degree of presence of the selected features to produce a feature map. Based on the feature map, the channel prediction operation 614 may refine the image and generate a mask prediction for an image object. The mask prediction may then be further refined by passing the output from the up-sampling operation 604, via skip connection 618, to the sum operation 616 and adding the mask prediction to the output from the up-sampling operation 604. The result 620 of the sum operation 616 (e.g., sum of the mask prediction and the output from the up-sampling operation 604) may result in an object mask prediction. The residual block 600 may also be configured to generate a result 620 that is a hotspot map. In such embodiments, eye-gaze 608 is not present as the eye-gaze information will not yet have been generated. Once result 620 (e.g., mask prediction) has been generated, the result may be passed to a subsequent residual block for further refining and up-sampling. However, when the result 620 has been sufficiently refined, the result 620 may be output to the editing engine 140, the crop suggestion module 120, and/or tracking component 116 of FIG. 1.

FIG. 7 illustrates an exemplary mask and hotspot tracking network architecture, in accordance with embodiments of the present invention. The exemplary mask and hotspot tracking network 700 includes an object template 702, an object tracking neural network 706 (e.g., SiamRPN), and an object mask and tracking module 730 comprising a plurality of encoder blocks 710, a plurality of decoder blocks 716 and 718, and a plurality of skip links 712 and 714. Object template 702 may be generated based on the object mask 516 generated in FIG. 5. For example, an object may be identified by the object mask 516 and a crop box or bounding box may be generated around the object to produce the object template 702, which may then be used in the mask and hotspot tracking network. The mask and hotspot tracking network 700, in operation, may receive a video frame 704A of a video segment, which may be input into the object tracking neural network 706 with object template 702. Based on the object template 702 and the video frame 704A, the object tracking neural network 706 may detect an object and generate a bounding box 708 around an object in video frame 704B, which corresponds to video frame 704A. The bounding box 708 may then be used to crop around the detected object. Subsequent frames of the video segment may also be processed, based on the object template 702, to generate a bounding box around the object in each frame of the video segment. Advantageously, a substantial portion of irrelevant information may be removed from the video frame 704B, which allows subsequent operations to generate more accurate results that would otherwise be possible.

The area inside the bounding box 708 of frame 704B may then be processed by the object mask and tracking module 730 by the plurality of encoder blocks 710, the plurality of decoder blocks 716 and 718, and the plurality of residual skip links 712 and 714, which may operate similar to elements of eye-gaze network 400 and gaze-to-mask network 500 from FIG. 4 and FIG. 5, respectively. However, the object mask and tracking module may comprise two parallel branches for hotspot and mask prediction, each including an encoder and decoder, to jointly generate a hotspot map 720 with hotspot 722 and an object mask 726 within video frame 704C for the object inside bounding box 708. For example, the plurality of encoder blocks 710 may operate similar to the plurality of encoder blocks 404 (FIG. 4) for the eye-gaze network 400 and the plurality of encoder blocks 506 (FIG. 5) for the gaze-to-mask network 500. The skip link 712 may operate similar to skip link 408 (FIG. 4). The plurality of skip links 714 may operate similar to the plurality of residual skip links 510 and plurality of eye-gaze skip links 512 (FIG. 5). This process may be repeated for each frame of the video segment in order to produce a hotspot map and object mask for each frame of the video segment. However, it should further be noted that the respective encoders for the mask and hotspot branches are not shared.

Figure 8:
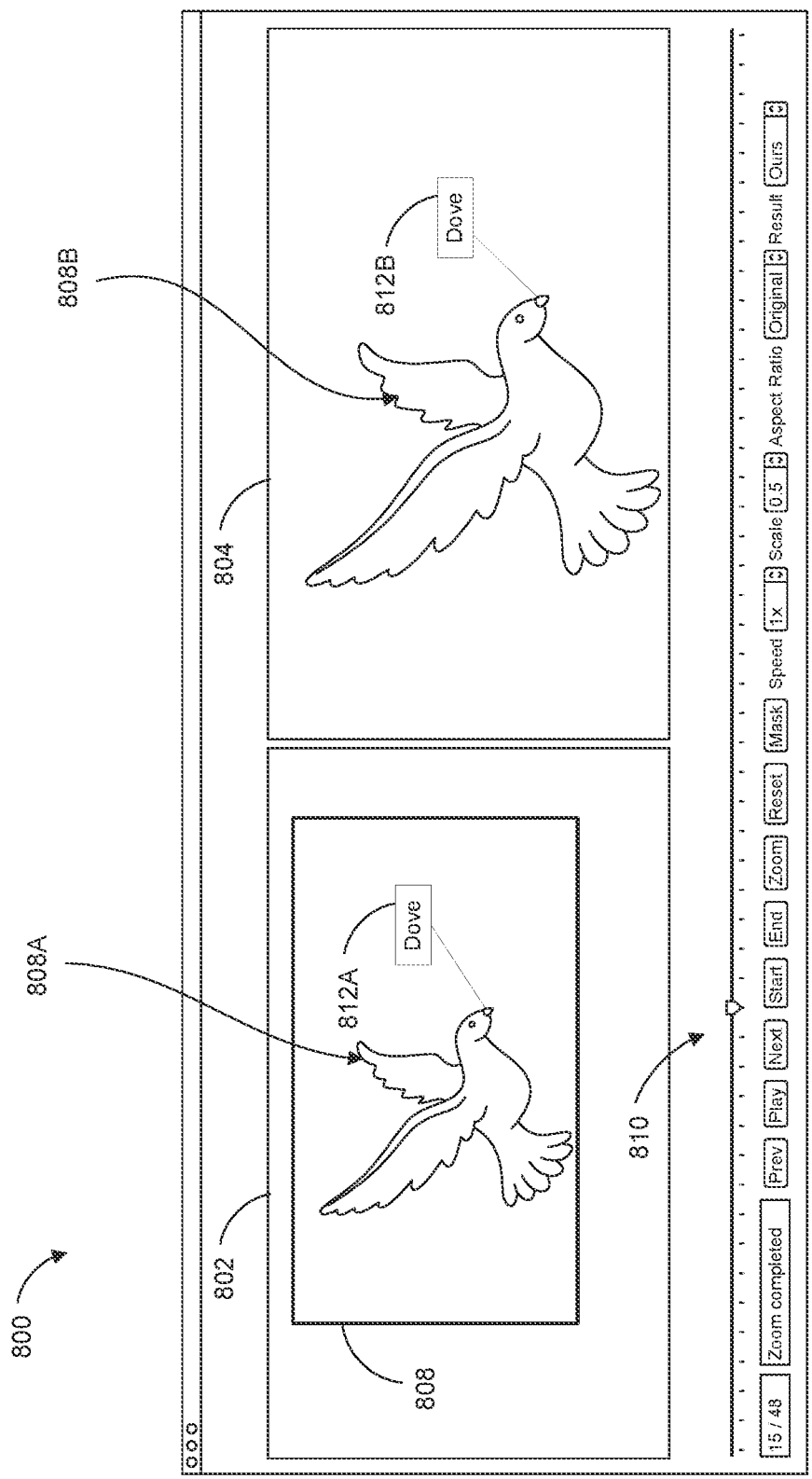
FIG. 8 illustrates an exemplary user interface, in accordance with embodiments of the present invention.

FIG. 8 illustrates an exemplary user interface 800, in accordance with embodiments of the present invention. The exemplary user interface 800 includes display 802 for viewing an original version of a video segment, display 804 for viewing the video segment with an applied editing effect (e.g., zoom-in, zoom-out, retargeting, object tag, lens blur effect) and a plurality of selection indicators 806. For example, the selection indicators 806 may include display buttons (e.g., Previous/Play/Next) to control the status of videos playing during video playback. The selection indicators 806 may further include operation buttons (e.g., Start/End/Zoom/Mask), which may be used to give initial settings for a cropping status or editing effect. The selection indicators 806 may further include list buttons (e.g., Speed/Scale/Aspect Ratio/Result), which may allow users to make setting choices for the editing and/or reframing process. In addition, the user interface 800 may include a slider bar 810 to indicate indexes of video frames and to show video progress during video playback, which the user may refer to select a start/end frame of the video segment.

In operation, a user may define various parameters for causing an editing effect on a video segment by making selections on selection indicators 806. For example, a user may select an aspect ratio for a cropping box, a zoom speed, a visual effect, and/or a specific reframing effect the user wishes to apply to a video segment. After these parameters have been selected, a user may draw bounding boxes on any frame of the video segment for a reframing operation. For example a user may define a start and/or end bounding box for a video cropping process. Additionally or alternatively, a user may select a salient portion of a video frame for adding an object tag, lens blur or other visual effect. The user's selections may be output to the editing engine of the present disclosure, which may perform an editing effect and return a modified version of the video segment. The user may then view the original version of the video segment in display 802 and the modified version of the video segment in display 804. These two versions of the video segment may be displayed simultaneously. Additionally, the user may view the crop box 808 that was produced by the editing engine to perform the reframing effect. The crop box 808 may correspond with the full frame of display 804. As can be seen, object 808A and object 808B are the same object in the same frame of the video segment. However, object 808B appears larger in display 804 because a reframing effect has been performed on the original video segment using crop box 808 to zoom in on the object 808A/B and to adjust the position of the object in the frame of the display. Further, an object tag may be added to the image in association with a hotspot of an object such that the object tag will move with the object through the frames of a video segment. For example, an object tag 812A may be added to indicate that object 808A is a dove. The modified version of the video segment may then include the object tag 812B, which corresponds to object tag 812A and will move with the object 808B throughout the video segment based on the location of a hotspot for the object 808A/B. Advantageously, the user can view the original version and the modified version of the video segment to compare the two and evaluate whether the user is satisfied with the editing effect.

Additionally, a user may select 'Mask' from the selection indicators 806 to view a hotspot map and a mask. The hotspot map and mask may be viewed for a frame of the video segment or for each frame of the video segment while the video segment is played in a display window. The hotspot map and mask may be viewed by the user in either an offline mode or an online mode where an object may be tracked in real-time. Real-time object tracking may allow for live reframing (e.g., zooming) for better image capture and composition. Additionally, real-time object tracking may allow for the addition of visual effects (e.g., image blur, auto focus, object tagging) based on real-time hotspot and mask predictions. For example, the video editing system 100 may be included in a mobile device and, while a user is recording a video, a mobile user interface may provide users the ability to associate visual effects with objects based on determining the hotspot and object mask for the objects in the video in real-time.

Users may preview a variety of editing effects via user interface 800. The interface provides users with an automatic zoom effect. To process a video with the automatic zoom effect, a user may define a zoom scale via the selection indicators 806. For example a user may select a zoon scale between 0.4-0.8. The user may then select a selection indicator to perform the zoom operation and subsequently view the zoom operation in the display 804. The automatic zoom effect may also allow a user to define a zoom speed (e.g., 2× or 0.5×) by selecting a zoom speed from a drop-down list.

Figure 9:
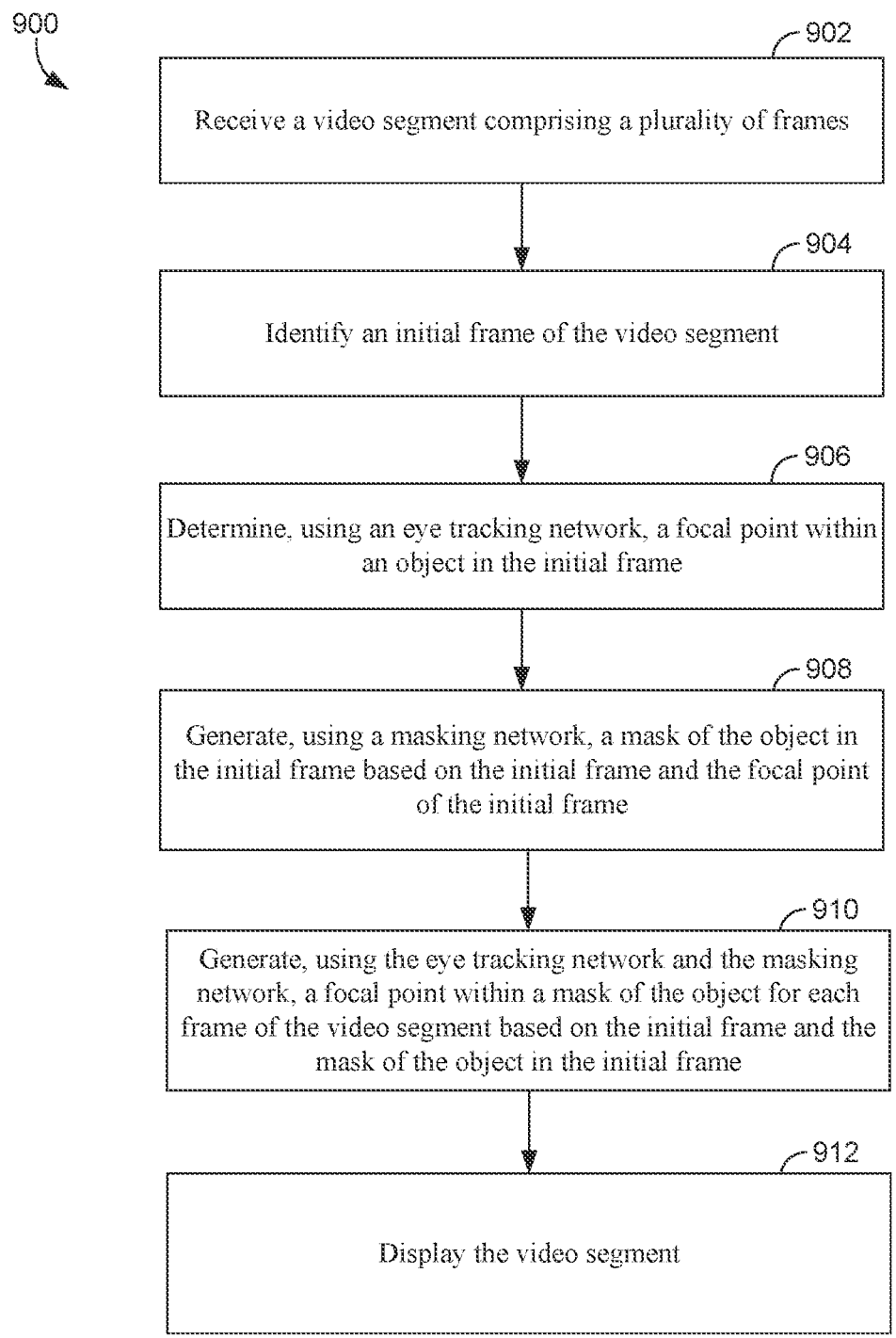
FIG. 9 illustrates an exemplary flow diagram for generating a focal point and an object mask for each frame of a video segment, in accordance with embodiments of the present invention.

With reference to FIG. 9, a flow diagram is provided illustrating method 900 for generating a focal point and a mask of an object. Each block of method 900, and any other methods described herein, comprise a computing process performed using any combination of hardware, firmware, and/or software. For instance, various functions can be carried out by a processor executing instructions stored in memory. The methods can also be embodied as computer-usable instructions stored on non-transitory computer storage media. The methods can be provided by a standalone application, a service or hosted service (standalone or in combination with another hosted service), or a plug-in to another product, to name a few. The method 900 may be implemented by the video editing system 100 as described in conjunction with FIGS. 1-8.

Turning to FIG. 9, FIG. 9 illustrates a method 900 in accordance with embodiments described herein. Method 900 can be performed, for instance, by video editing system 100 of FIG. 1. Initially at block 902, a video segment comprising a plurality of frames is received. At block 904, an initial frame of the video segment is identified. At block 906, a focal point within an object in the initial frame is determined using an eye tracking network. At block 908, a mask of the object in the initial frame based on the initial frame and the focal point of the initial frame using a masking network is generated. At block 910, a focal point within a mask of the object for each frame of the video segment based on the initial frame and the mask of the object in the initial frame is generated using the eye tracking network and the masking network. At block 912, the video segment is displayed.

Illustrative Computing Environment

Figure 10:
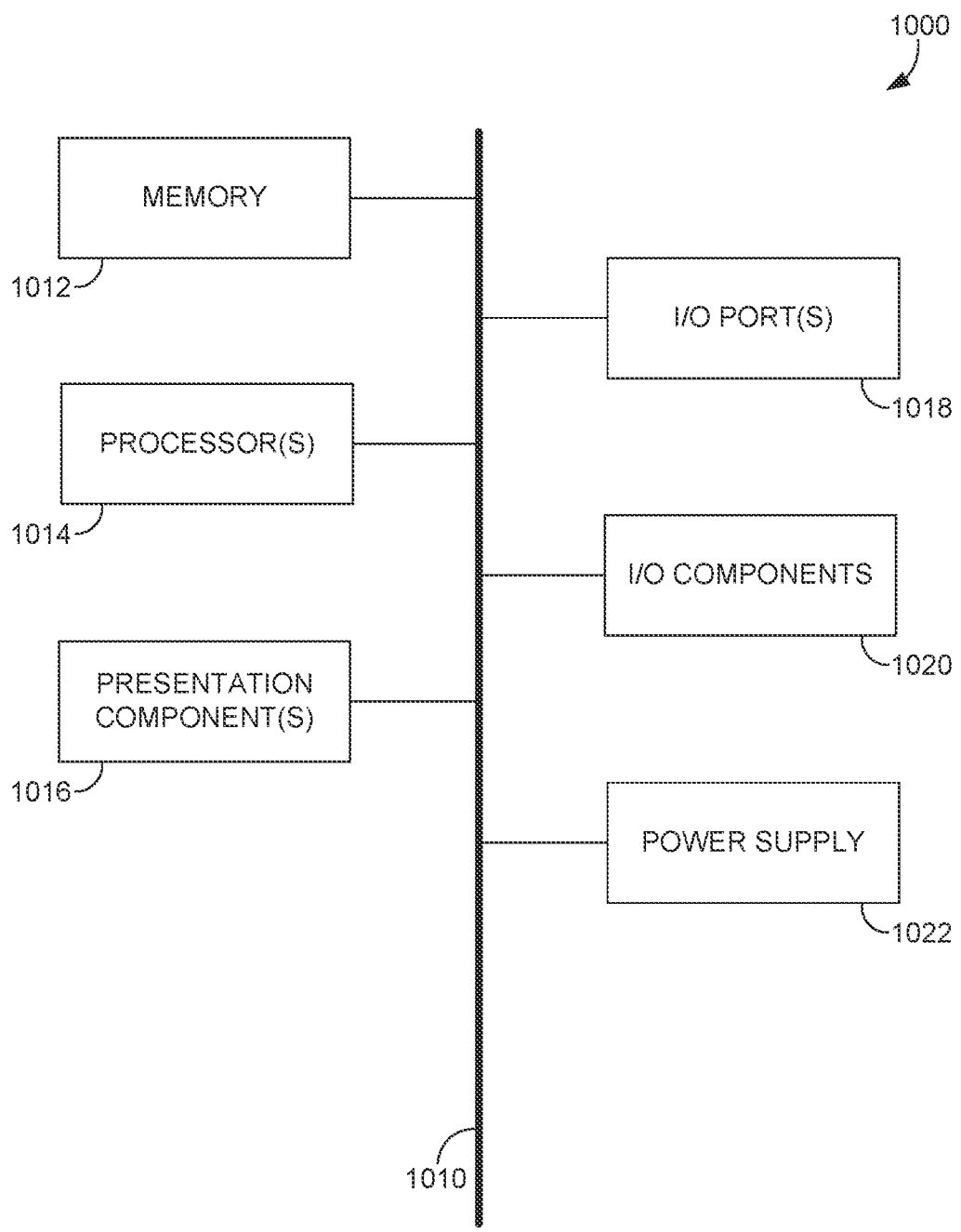
FIG. 10 is an example operating environment for implementing embodiments of the present invention.

Having briefly described an overview of embodiments of the present invention, an example operating environment in which embodiments of the present invention may be implemented is described below in order to provide a general context for various aspects of the present invention. Referring initially to FIG. 10 in particular, an example operating environment for implementing embodiments of the present invention is shown and designated generally as computing device 1000. Computing device 1000 is but one example of a suitable computing environment and is not intended to suggest any limitation as to the scope of use or functionality of the invention. Neither should computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art and reiterate that the diagram of FIG. 10 is merely illustrative of an example computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of non-transitory computer-readable media. Non-transitory computer-readable media can be any available media that can be accessed by computing device 1000 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes non-transitory computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 700 to be logically coupled to other devices including I/O components 1020, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low level software written in machine code can provide more complex functionality to higher levels of software. As used herein, computer-executable instructions include any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and sub-combinations are of utility and may be employed without reference to other features or sub-combinations. This is contemplated by and is within the scope of the claims.

What is claimed is:

1. A method comprising:
generating a mask of an object in a video segment based on an initial frame of the video segment and a first focal region associated with the object in the initial frame;
for each frame of a plurality of frames of the video segment, generating, based on the frame and the mask of the object, using a neural network, a corresponding focal region associated with the mask of the object that tracks the object through the plurality of frames; and
executing an operation based on the corresponding focal region for one or more frames of the plurality of frames.

2. The method of claim 1, further comprising generating the mask using a masking network.

3. The method of claim 1, further comprising generating the first focal region, using a focal region prediction network and based on the initial frame of the video segment, by extracting spatial features of the initial frame during an encoding process and decoding the spatial features.

4. The method of claim 1, wherein the neural network comprises a first branch configured to generate the corresponding focal region and a second branch configured to generate a corresponding mask of the object in the frame.

5. The method of claim 1, further comprising generating the mask by:
receiving, at a decoder block of a masking network, spatial information extracted by an encoder block of the masking network via a skip connection; and
integrating the spatial information with a representation of the first focal region.

6. The method of claim 1, further comprising generating the mask of the object by:
extracting, by an encoder block of a masking network, image features of the initial frame;
receiving the image features at a decoder branch via a first skip connection from the encoder block;
receiving a representation of the first focal region at the decoder branch via a second skip connection;

generating an integrated input that integrates the image features and the representation of the first focal region; and generating, by the decoder branch, the mask of the object based on the integrated input.

7. The method of claim 1, further comprising generating the corresponding focal region for the frame by: generating a template image of the object by cropping the initial frame based on the mask, and feeding the template image and the frame into the neural network.

8. A computer system comprising:
one or more hardware processors and memory configured to provide computer program instructions to the one or more hardware processors;
a segmentation and hotspot module configured to use the one or more hardware processors and the memory to:
generate a mask of an object in a video segment based on an initial frame of the video segment and a first focal region associated with the object in the initial frame; and
for each frame of a plurality of frames of the video segment, generate, based on the frame and the mask of the object, using a neural network, a corresponding focal region associated with the mask of the object that tracks the object through the plurality of frames; and
a crop suggestion module configured to use the one or more hardware processors and the memory to execute an operation based on the corresponding focal region for one or more frames of the plurality of frames.

9. The computer system of claim 8, further comprising a masking network configured to generate the mask.

10. The computer system of claim 8, further comprising a focal region prediction network configured to generate the first focal region based on the initial frame of the video segment by extracting spatial features of the initial frame during an encoding process and decoding the spatial features.

11. The computer system of claim 8, wherein the neural network comprises a first branch to generate the corresponding focal region and a second branch configured to generate a corresponding mask of the object in the frame.

12. The computer system of claim 8, further comprising a masking network configured to generate the mask by:
receiving, at a decoder block of the masking network, spatial information extracted by an encoder block of the masking network via a skip connection; and
integrating the spatial information with a representation of the first focal region.

13. The computer system of claim 8, further comprising a masking network configured to generate the mask by:
extracting, by an encoder block of the masking network, image features of the initial frame;
receiving the image features at a decoder branch via a first skip connection from the encoder block;
receiving a representation of the first focal region at the decoder branch via a second skip connection;
generating an integrated input that integrates the image features and the representation of the first focal region; and
generating, by the decoder branch, the mask of the object based on the integrated input.

14. The computer system of claim 8, wherein the segmentation and hotspot module is further configured to generate the corresponding focal region for the frame based on the mask by generating a template image of the object by cropping the initial frame based on the mask, and feeding the template image and the frame into the neural network.

15. The computer system of claim 8, wherein the crop suggestion module is further configured to execute an editing operation based on the corresponding focal region for the one or more frames.

16. One or more non-transitory computer-readable storage media storing instructions executable by a computing device to cause the computing device to perform operations comprising:
generating a mask of an object in a video segment based on an initial frame of the video segment and a first focal region associated with the object in the initial frame;
for each frame of a plurality of frames of the video segment, generating, based on the frame and the mask of the object, using a neural network, a corresponding focal region associated with the mask of the object that tracks the object through the plurality of frames; and
executing an operation based on the corresponding focal region for one or more frames of the plurality of frames.

17. The one or more non-transitory computer-readable storage media of claim 16, the operations further comprising generating the mask using a masking network and generating the first focal region using a focal region prediction network and based on the initial frame of the video segment by extracting spatial features of the initial frame during an encoding process and decoding the spatial features.

18. The one or more non-transitory computer-readable storage media of claim 16, the operations further comprising generating the mask by:
receiving, at a decoder block of a masking network, spatial information extracted by an encoder block of the masking network via a skip connection; and
integrating the spatial information with a representation of the first focal region.

19. The one or more non-transitory computer-readable storage media of claim 16, the operations further comprising generating the mask by:
extracting, by an encoder block of a masking network, image features of the initial frame;
receiving the image features at a decoder branch via a first skip connection from the encoder block;
receiving a representation of the first focal region at the decoder branch via a second skip connection;
generating an integrated input that integrates the image features and the representation of the first focal region; and
generating, by the decoder branch, the mask of the object based on the integrated input.

20. The one or more non-transitory computer-readable storage media of claim 16, wherein the operations further comprise generating the corresponding focal region for the frame based on the mask comprises generating a template image of the object by cropping the initial frame based on the mask, and feeding the template image and the frame into the neural network.

* * * * *